United States Patent

Nelson

[11] 4,050,291
[45] Sept. 27, 1977

[54] FILTER CONDITION RESPONSIVE DEVICE COMPENSATED FOR CHANGES IN MEDIUM FLOW

[75] Inventor: Lorne W. Nelson, Bloomington, Minn.

[73] Assignee: Honeywell Inc., Minneapolis, Minn.

[21] Appl. No.: 292,575

[22] Filed: Sept. 27, 1972

[51] Int. Cl.² .......................................... G01N 15/08
[52] U.S. Cl. ............................................ 73/38; 55/270; 55/274; 116/114 R
[58] Field of Search ................. 55/270, 274, 213, 217; 73/38, 204; 116/70, 114 R; 210/87

[56] References Cited

U.S. PATENT DOCUMENTS

| | | |
|---|---|---|
| 2,650,496 | 9/1953 | Middleton et al. ............ 73/204 |
| 3,172,747 | 3/1965 | Nodolf ........................... 55/387 |
| 3,359,797 | 12/1967 | Preller .......................... 73/204 |
| 3,466,925 | 9/1969 | Ziegenhagen .................. 73/38 |
| 3,680,377 | 8/1972 | Lightner ....................... 73/204 |
| 3,771,365 | 11/1973 | Schempp ................... 55/274 X |

FOREIGN PATENT DOCUMENTS 228,321  8/1968   U.S.S.R. ................................. 73/38

*Primary Examiner*—William A. Cuchlinski, Jr.
*Attorney, Agent, or Firm*—Clyde C. Blinn

[57] ABSTRACT

A filter condition responsive apparatus for a range or stove vent system containing a first filter for filtering grease and a second series connected filter for the removal of odors. A first pressure responsive device responds to the pressure drop across the grease filter to provide an output indicative of the collection of grease on the filter. A second pressure responsive device responds to the pressure drop across the second filter to provide an output indicative of the flow of air through the filter. The output of the two devices are connected to provide an indication of the condition of the grease filter independent of any change in air flow.

6 Claims, 3 Drawing Figures

FILTER CONDITION RESPONSIVE DEVICE COMPENSATED FOR CHANGES IN MEDIUM FLOW

BACKGROUND AND SUMMARY OF THE INVENTION

Differential pressure responsive devices responding to the pressure drop across filters to provide an indication of a predetermined collection of foreign material on the filter are old such as shown in the U.S. Murrell F. Kautz et al U.S. Pat. No. 3,027,865 issued Apr. 3, 1962. In systems using differential pressure responsive devices such as that disclosed in the Kautz patent whether in a forced air heating and/or cooling system or in a range hood vent system, the flow of air has been relatively constant.

The present invention is concerned with the compensation of a differential pressure responsive filter condition indicator for changes in the rate of flow of the medium flowing through the filter. Specifically, a differential pressure responsive device responding to a condition indicative of flow is connected to compensate for the effects of changes in flow on the differential pressure responsive device responding to the pressure drop across the filter. As the flow of medium through the filter changes a flow signal will be obtained and an output signal will be truly indicative of the condition of the filter.

DESCRIPTION OF THE INVENTION

Figure 1:
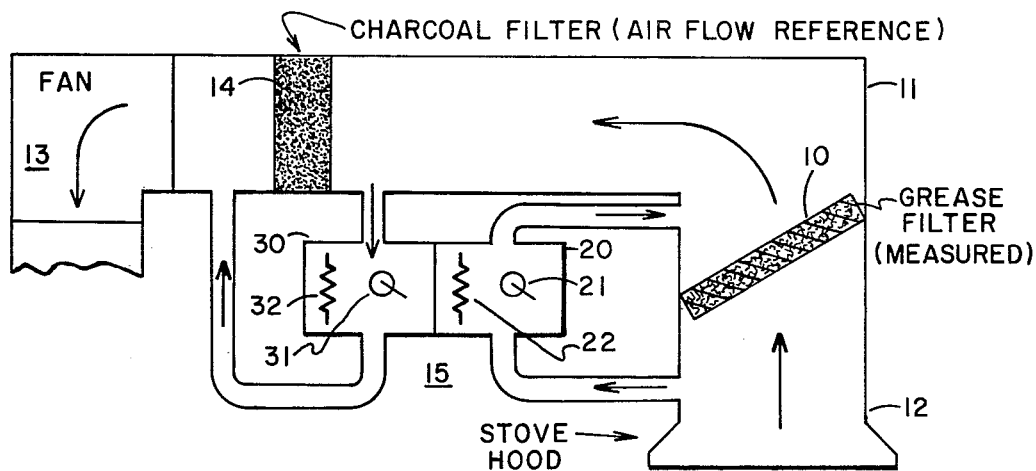
FIG. 1 is a schematic showing of a typical installation of the present invention for use in a stove hood vent system containing a grease filter and a charcoal filter.

Referring to FIG. 1 one particular medium or air system is shown in which the medium is filtered by a filter 10. Filter 10 is a grease filter mounted in pipe or duct 11 connected to a range or stove hood 12 for venting air from a stove. Filter 10 might be a common shredded aluminum filter for removing the foreign material or grease from the air passing through the filter under the force of a multispeed fan 13. A second filter 14 in series with filter 10 is a charcoal filter of the type shown in Keith M. Nodolf U.S. Pat. No. 3,172,747 issued Mar. 9, 1965 for removing odors from the air. While a stove venting system is shown, the invention can be used in a water filtering system and other air systems such as heating and cooling systems for buildings.

A filter condition responsive apparatus 15 comprises a first bypass or chamber 20 containing a thermistor 21 which is constantly heated by an electrical heater 22. As a differential pressure exists across filter 10, the air flow through the bypass removes heat from thermistor 21 and the change in resistance due to the drop in temperature is indicative of the differential pressure across filter 10. For filter 10, the differential pressure is a function of air flow and filter condition which can depend on the build-up of foreign material or grease on the filter. Similarly a bypass 30 across filter 14 has a thermistor 31 which is constantly heated by an electrical heater 32. The resistance of thermistor 31 is indicative of the pressure drop and thus the rate of flow of air through filter 14, duct 11 and filter 10.

Figure 2:
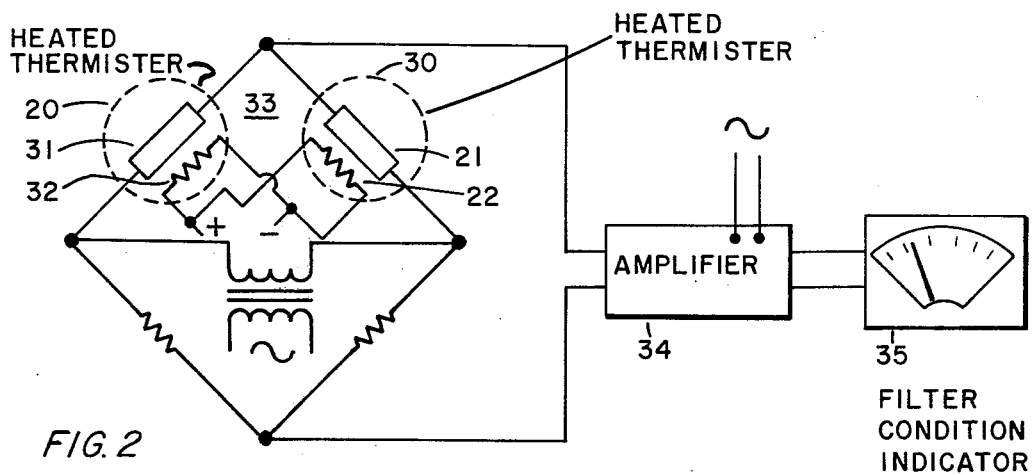
FIG. 2 is a circuit diagram of the responsive apparatus used to measure the conditions in the system of FIG. 1.

Referring to FIG. 2 the electrical bridge network circuit or comparison means 33 contains thermistors 21 and 31 in adjacent legs; so that, the output of bridge circuit 33 connected to the input of a conventional amplifier 34 is indicative of the difference in resistance between thermistors 21 and 31. The output of the bridge circuit is indicative of the pressure drop across filter 10 resulting in the restriction of air flow through the filter due to the accumulation of grease independent of the changes in rate of air flow. The output of amplifier 34 is connected to a conventional meter, filter condition indicator or control device 35.

Figure 3:
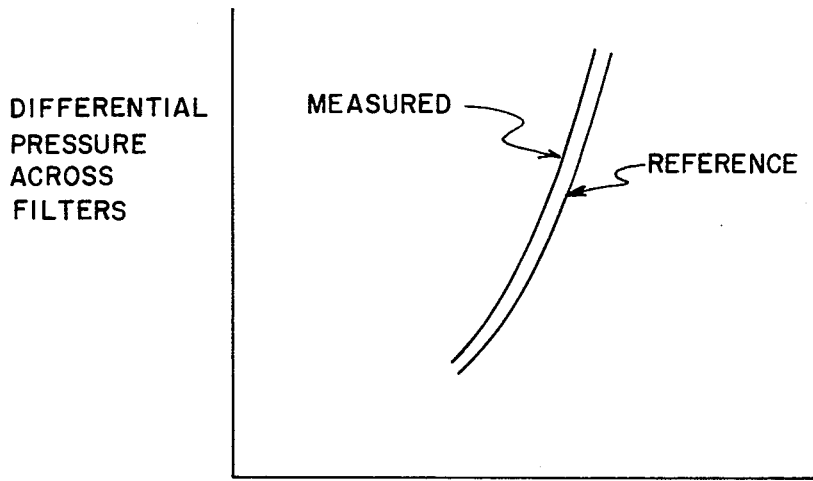
FIG. 3 is a graphical representation of the differential pressure versus air flow for the measured and reference filters.

In selecting filters 10 and 14, the differential pressure across the filter for various air flow as shown in the characteristic curve in FIG. 3 should be somewhat the same. At the same time, the loading efficiency characteristics of filter 14 are much lower than filter 10 so that as grease or foreign material collects on filter 10 filter 14 is not appreciably affected and an output signal truly indicative of the air flow is available. In the particular example shown in FIG. 1, the loading characteristics of a charcoal filter for the material to be collected by filter 10 is much different and yet the effects of the changes in air flow through the filter brought about by changes of flow air through the duct 11 produces equal pressure drops across the filters.

OPERATION OF THE INVENTION

Assume that the filtering system of FIG. 1 was placed in operation with a clean grease filter 10. As the fan speed changed or any other condition took place to change the rate of flow of the air through duct 11 the pressure drop across filter 10 due to air flow is compensated by the change in flow rate through filter 14 as the pressure drop across filter 14 is similar. As grease accumulated on filter 10 to restrict the flow of air through the filter, the increase in pressure drop across the filter 10 increases the air flow through the bypass 20 and thus decreases the temperature of the heated thermistor 21. As the air flow through both filters and thus the pressure drop across the two filters remains the same due to air flow, the effect upon the cooling of each of the thermistors 21 and 31 due to the air flow is the same and thus changes in air flow rate produces no output from bridge circuit 33. As the filter 10 collected grease, the resistance of thermistor 21 changes due to an increase in cooling resulting in an increase in the output from bridge 33 to be indicated on the filter condition indicator 35.

The embodiments of the invention in which an exclusive property or right is claimed are defined as follows:

1. A filter condition responsive apparatus for responding to the presence of a predetermined collection of material in a filter from the medium flowing through a pipe and through the filter comprising, differential pressure responsive means adapted to be connected to the pipe on each side of the filter to respond to the drop in pressure of the medium flowing in the pipe due to the restriction produced by the filter, said differential pressure increasing as the filter collects material from the medium and being effected by a change in the rate of flow of the medium through the filter, said means providing a first output, flow responsive means adapted to be connected to the pipe to provide a second output indicative of the rate of flow of medium through the pipe, and comparison means connected to said differential pressure response means and said flow responsive means for comparing said first and second outputs, said comparison means providing an output only indicative of the change in pressure drop across said filter due to the presence of material collected in the filter from the medium as the effect of a change in rate of medium flow is cancelled.

2. The invention of claim 1 when used with a second filter connected in series with said first mentioned filter wherein said flow responsive means is a pressure responsive means adapted to respond to the pressure drop across a second filter through which the medium flows.

3. The invention of claim 2 wherein, said differential pressure responsive means is a heated temperature responsive means in a medium flow path adapted to bypass the first mentioned filter, said flow responsive means is a heated temperature responsive means in a medium flow path adapted to bypass the second filter, and said comparison means is bridge network circuit means in which said first and second temperature responsive means are connected to oppose each other, said bridge circuit means providing said filter condition output.

4. The invention of claim 1 wherein, the filter is a grease filter in a range hood through which air is drawn to remove airborne cooking grease, said differential pressure responsive means is a differential air pressure responsive means adapted to respond to the air pressure drop across the grease filter, said pressure drop changes as more grease is collected in the filter.

5. The invention of claim 4 for use with the grease filter and a second filter connected in series with the grease filter, the second filter for removing other foreign material from the air wherein said flow responsive means is a differential air pressure responsive means adapted to respond to the pressure drop across the second filter.

6. A filter condition responsive apparatus for use with an air filtering system containing a first and second filter connected in series air flow for removing different types of foreign material from the air, the filters having similar pressure drop versus air flow characteristics and the second filter having a low loading efficiency for the material removed by the first filter, said filter condition responsive apparatus comprising first differential pressure responsive means adapted to respond to the pressure drop across the first filter which is indicative of the condition of the filter and the rate of air flow through the filter, second differential pressure responsive means adapted to respond to the pressure drop across the second filter which is indicative of the rate of air flow through the second filter, and means for connecting said first and second pressure responsive means providing an output signal indicative of the condition of the first filter.

* * * * *